US006257609B1

(12) United States Patent
O'Neill, Sr.

(10) Patent No.: US 6,257,609 B1

(45) Date of Patent: Jul. 10, 2001

(54) TILT-IN-SPACE WHEELCHAIR

(76) Inventor: Theodore C. O'Neill, Sr., 1035 Nicole Dr., Newtown Square, PA (US) 19073

(*) Notice: Subject to any disclaimer, the term of this patent is extended or adjusted under 35 U.S.C. 154(b) by 0 days.

(21) Appl. No.: 09/049,482

(22) Filed: Mar. 27, 1998

(51) Int. Cl.[7] ........................................ B62B 11/00

(52) U.S. Cl. ........................ 280/304.1; 280/250.1

(58) Field of Search ..................... 280/304.1, 304.2, 280/304.5, 250.1

(56) References Cited

U.S. PATENT DOCUMENTS 4,732,423 * 3/1988 Condon ................................ 297/284
4,893,827 * 1/1990 Gay et al. ......................... 280/250.1
4,966,379 * 10/1990 Mulholland ....................... 280/242.1
5,044,647 * 9/1991 Patterson .......................... 280/250.1
5,188,383 * 2/1993 Thompson ......................... 280/250.1
5,253,886 * 10/1993 Weege ................................... 280/39
5,294,141 * 3/1994 Mentessi et al. ................. 280/250.1
5,718,442 * 2/1998 Alexander et al. ............... 280/250.1
6,131,940 * 10/2000 Arnoth ......................... 280/250.1 X

OTHER PUBLICATIONS

"Tilt & Recline: A Balance of Cost and Consumer Need", *Team Rehab Report*, Miramar Communications, Inc., Apr., 1996 (ISSN 1053–5926).

* cited by examiner

*Primary Examiner*—Lanna Mai
*Assistant Examiner*—Joseph Schell
(74) *Attorney, Agent, or Firm*—E. Alan Uebler, PA

(57) ABSTRACT

A tilt-in-space wheelchair is provided in which all seating angles are preset to a patient's needs and the entire seating system may be tilted backwardly or forwardly as a single unit, as desired, to redistribute the patient's sitting pressures. The apparatus is light in weight and may be installed on conventional, manually propelled folding wheelchairs and, when installed, the chair may still be folded to transport it to a different location. In use, the apparatus allows the sitting patient to be repositioned while maintaining in place all preset relative orientations of the patient's body and limbs.

9 Claims, 6 Drawing Sheets

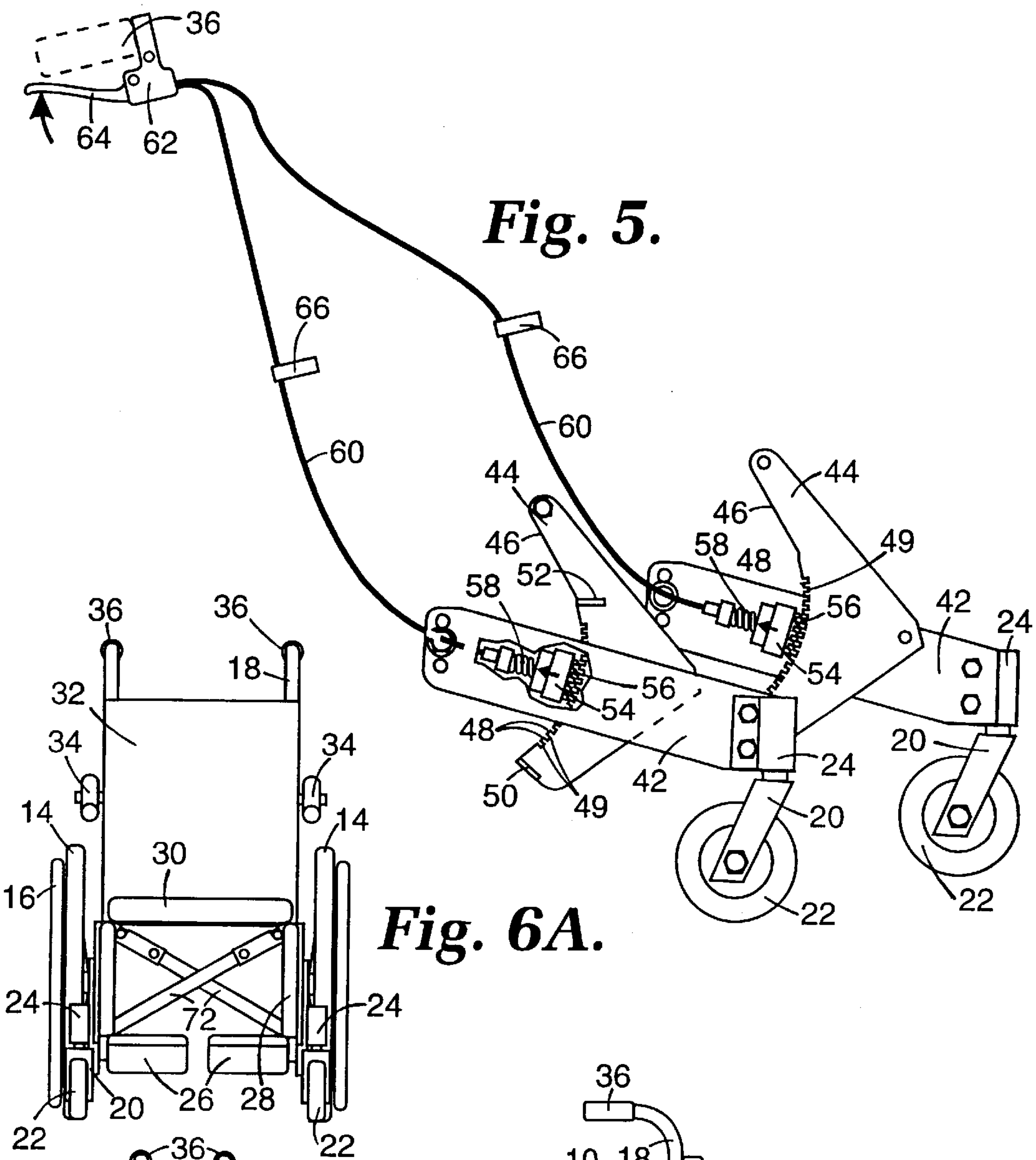
Fig. 5.
Fig. 6A.
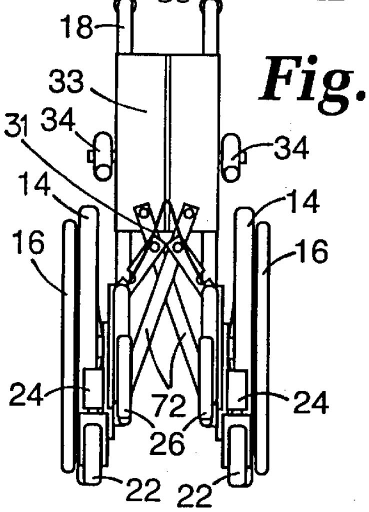
Fig. 6B.
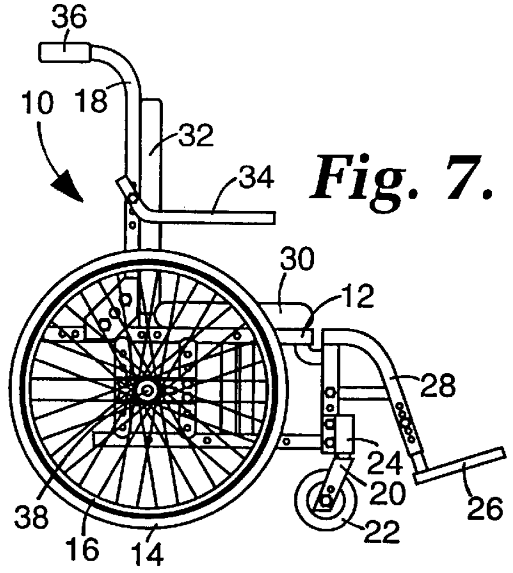
Fig. 7.

TILT-IN-SPACE WHEELCHAIR

BACKGROUND OF THE INVENTION

Tilt-in-space or tilt-and-recline wheelchairs are known. See, for example, the survey article titled "Tilt & Recline: A Balance of Cost and Consumer Need", which appeared in *Team Rehab Report*, Miramar Communications, Inc., April, 1996 (ISSN 1053-5926). A consensus of opinion in the design of such chairs appears to indicate that cost and mechanical adaptability are key factors needing improvement to satisfy current needs of patients who require such chairs for mobility.

Wheelchair bound patients, who spend most of their day in fixed-in-space seating, or in seating having limited ability to recline, can develop body sores, aches and pains and general malaise resulting from the pressure of sitting in a single position for extended periods of time. "Tilt-in-space" is an option that is available on some higher priced wheelchairs that allows the frame and attached seating system to be tilted or rotated in space. This is often needed to better position a patient who is hypotonic by allowing gravity to help keep him/her sitting upright. This feature is also often used in reducing sitting pressures by tilting and thus transferring pressure from the seat surface to the back surface in an effort to prevent decubitus ulcers in patients who cannot otherwise effect weight shifts.

Problems associated with current tilt-in-space wheelchairs may include:

Inability to fold the wheelchair in the conventional way for transport in a vehicle;

High cost; and

Weight.

Previous efforts have been made to provide wheelchair assemblies having adjustable seating which are also economically feasible, and are described in previous patents. For example, U.S. Pat. No. 5,292,144 describes a conversion kit for standard wheelchairs whereby a wheelchair with a stationary fixed seat can be retrofitted with a tiltable seat having a reclinable back. The seat and back may be separately adjusted by extendible, lockable adjusters and the seat and back apparatus is mountable upon conventional wheelchair constructions. See also the patents described therein. The apparatus of that invention must be removed in order to transport the chair from one site to another, and must be reassembled at the new location.

U.S. Pat. No. 4,565,385 discloses a tiltable supporting wheelchair having a tilting mechanism with front support wheels which pivot downwardly and outwardly engaging the floor and raising the front of the wheelchair, thereby tilting it backwardly. The tilting mechanism includes a cross-frame pivotably attached to the frame of the wheelchair and activated by movement of an attached arm. The arm is controlled by a rod leading to a pivotable plate which is connected to a lever on the side of the wheelchair by a linkage. Upon movement of the lever, the linkage rotates the plate, moving the arm and cross-frame to extend or retract the front wheels. A locking mechanism prevents accidental movement of the lever. Rear supports extend behind the wheelchair and engage the floor upon the front wheels being pivoted to their furthest point forward. This device also must be disassembled for transporting it from one site to another. Furthermore, when the tilt feature of this device is activated, the legrests simultaneously elevate, resulting in knee extension which is undesirable in most situations. The general purpose of a "tilt-in-space" chair is to rotate the patient posteriorly while at the same time maintaining 90 degree angles at the hips and knees. This prior apparatus does not maintain all relative positioning angles of the patient's body and limbs upon tilting of the chair.

SUMMARY OF THE INVENTION

An improved, manually propelled, tilt-in-space wheelchair is provided. A patient seated in the wheelchair may be tilted backwardly or forwardly so as to rotate the patient spatially while maintaining all relative positions of the patient's body and limbs fixed with respect to one another. The wheelchair is of the folding type having an X-brace frame mechanism which permits the unoccupied wheelchair to be folded side-to-side for ease of transport from one site to another. The wheelchair has conventional, large, paired drive wheels, and paired smaller, independently castered front wheels. The patient seating apparatus is supported by a support frame mounted on the axle, and includes seat, back, a headrest, legrests and armrests.

In its most general form, the wheelchair of the invention includes means for effecting rotation of the entire patient seating apparatus, including the patient seated thereon, about the axles of the large wheels, while maintaining the drive wheels and the front castered wheels all in fixed spatial relationship, i.e. resting on a fixed ground plane, with respect to each other. The chair also includes means for locking in place the patient seating apparatus at any desired rotation. A key feature of the present invention, and essential to the improvement provided, resides in the fact that the means for rotating the patient and the means for locking the apparatus at the desired rotation do not interfere with nor inhibit the ability of the chair to be folded, side-to-side, for transport.

In one embodiment, discussed more fully below, the improved apparatus includes elongate supporting brace members, each having a forward end and a rearward end, the rearward end of each being affixed to the support frame in close proximity to the wheel axle, one adjacent each drive wheel, with the forward end of each having a caster housing which houses one castered front wheel. The tilt-adjusting brace members each act cooperatively with one of the supporting braces, with each tilt-adjusting brace member also being affixed to the support frame at an intermediate position between the forward and rearward ends of its cooperating support brace and in adjacent proximity thereto. Means are provided for effecting relative movement of each tilt-adjusting brace member relative to its cooperating supporting brace so as to effect rotation of the patient seating apparatus about the wheel axles, and for locking the supporting braces in fixed positional relationship with respect to the tilt-adjusting brace members at a desired extent of rotation.

The tilt-adjusting brace members may each have arcuate, rearward edges possessing gear-like teeth therein, these arcuate edges being concave with respect to the axle and substantially concentric with respect thereto. The means for locking includes spring-biased tooth engaging means affixed to the supporting braces which releasably engage the gear-like teeth at the desired rotation and effect locking of the patient seating apparatus thereat.

In an alternate embodiment, the locking means include cam-actuated means for engaging and disengaging locking at any desired degree of spatial rotation of the chair, also by means of spring-biased tooth-engaging means.

The wheelchair may include a manually operated lever control mounted so as to be gripped by an attendant pushing the wheelchair and having flexible cable means mounted on the frame rearwardly of the patient. The cable preferably extends from the lever to the spring-biased tooth engaging locking means, providing manual control of the locking of the seating apparatus at the desired extent of rotation. Additional, independently adjustable means for spatially varying and adjusting each of the seat, back, headrest, legrests and armrests may be provided.

BRIEF DESCRIPTION OF THE DRAWINGS

In the drawings:

FIG. 5 shows the apparatus of the invention, which may be attached to an otherwise conventional wheelchair, in an unlocked, rotatable configuration;

FIG. 6A is a front elevational view of the wheelchair of the invention illustrating its cross-braces which are segmented, hinged and foldable, enabling the entire chair to be folded side-to-side for transport, which cross-braces do not interfere with the tilt-and-lock mechanisms of the chair;

FIG. 6B is a front view of the wheelchair shown in FIG. 6 in its folded configuration;

FIG. 7 is a side elevation of a conventional wheelchair;

DETAILED DESCRIPTION OF THE INVENTION AND PREFERRED EMBODIMENTS WITH REFERENCE TO THE DRAWINGS

A tilt-in-space wheelchair is provided in which all seating angles are preset to a patient's needs and the entire seating system may be tilted backwardly or forwardly as a single unit, as desired, to redistribute the patient's sitting pressures. The apparatus is light in weight and may be installed on conventional, manually propelled folding wheelchairs and, when installed, the chair may still be folded to transport it to a different location. In use, the apparatus allows the sitting patient to be repositioned while maintaining in place all preset relative orientations of the patient's body and limbs.

Figure 1:
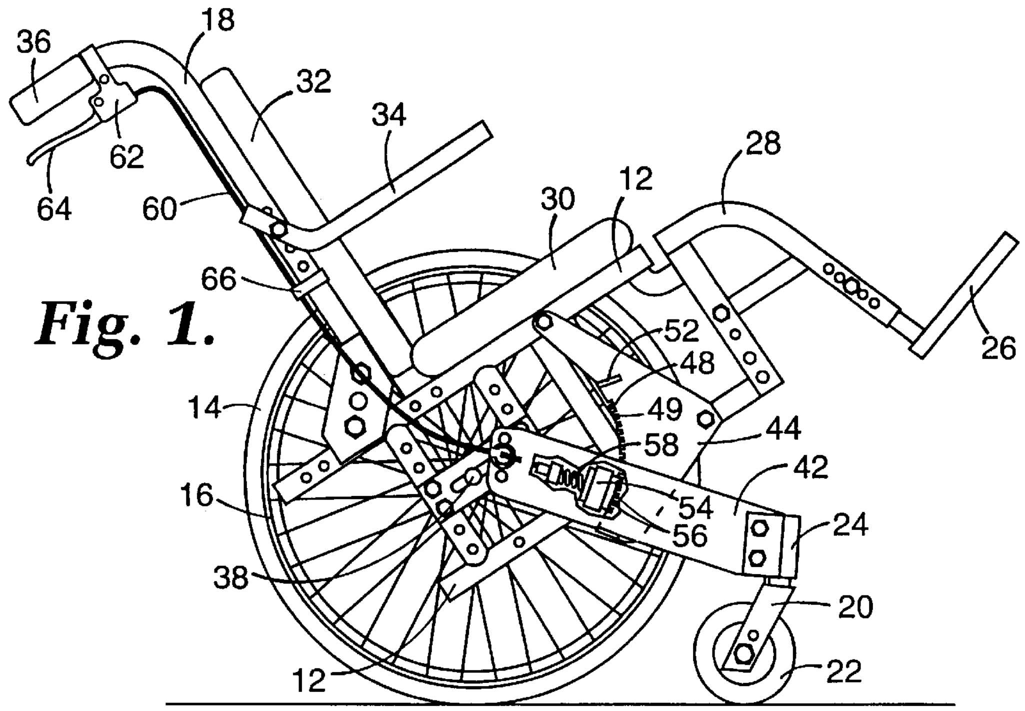
FIG. 1 is a side elevation, partly broken away, of one embodiment of the improved wheelchair of the invention, with the right-hand wheels (only) and associated mechanical components removed for clarity of illustration, in a tilted-back position.

A detailed description of the invention is best provided with reference to the drawings wherein FIG. 1 shows a side elevation partly broken away of one embodiment of the wheelchair of the invention in a tilted-back position. In this figure, the wheels on the right hand side of the chair are removed for clarity of illustration only. It will be understood that the chair is never used in this configuration. The right and left sides are substantially identical in function. FIG. 1 depicts the frame 12 of the chair to which are affixed the large drive wheels 14 having adjacent hand propelled drive rings 16. Back support frame 18 is also affixed to frame 12 as shown. The front caster housings 24 which house casters 20 and front castered wheels 22 are attached to the supporting braces 42 at the forward ends thereof. The left support brace 42 is visible in FIG. 1, its rearward end being affixed to frame 12 in close proximity to the axle 39 of wheels 14, and axle hub 38. Adjustable footrest 26 is affixed to legrest 28 which, in turn, is affixed to frame 12. Frame 12 also supports the seat 30 and back rest 32. Armrest 34 is attached to the back support frame 18 in the conventional manner, as is the handle 36.

The tilt-adjusting brace member 44, of which there are two with the right one being visible in FIG. 1, acts cooperatively with supporting brace 42. Brace member 44 is affixed as shown to frame 12 immediately adjacent the support member 42, and at an intermediate position between the forward end and the rearward (axle) end of support member 42. The paired tilt-adjusting brace members 44 each have arcuate rearward edges possessing gear teeth 48 and grooves 49 therein, with these arcuate edges being concave with respect to the wheel axle 39 and substantially concentric with respect to the axle. Mounted upon each support member 42 is a gear tooth engaging spring-biased head mechanism having spring-biased head 54 and spaced-apart gear teeth 56 extending from the head 54 and being capable of cooperatively meshing with the grooves 49 in brace member 44, being forced therein by bias spring 58. Engaging or disengaging of the teeth 56 at a desired degree of tilt of the chair is controlled by cables 60 which control the tension on the spring 58 by means of cable lever handles 64, held in position and affixed to the back support frame by cable handle housing 62 and cable guide and support 66. The spring biased head mechanism 54 provides a means for locking and unlocking the seating apparatus of the chair at a desired degree of rotation about the axle 39. Compressing lever 64 unlocks the gear teeth 56 from their respective seating grooves 49 in brace members 44 and allows the seating apparatus to be rotated. Releasing lever 64 at the desired tilt permits seating of the teeth 56 into the respective grooves 49 and locking of the frame assembly thereat, all while maintaining drive wheels 14 and castered front wheels 22 in a fixed spatial relationship with respect to each other, i.e. all remaining on the ground plane. In this manner, a patient seated in the chair may be tilted backwardly and forwardly, as needed, so as to rotate the patient spatially while maintaining all relative positions of the patient's body and limbs fixed with respect to one another.

Figure 2:
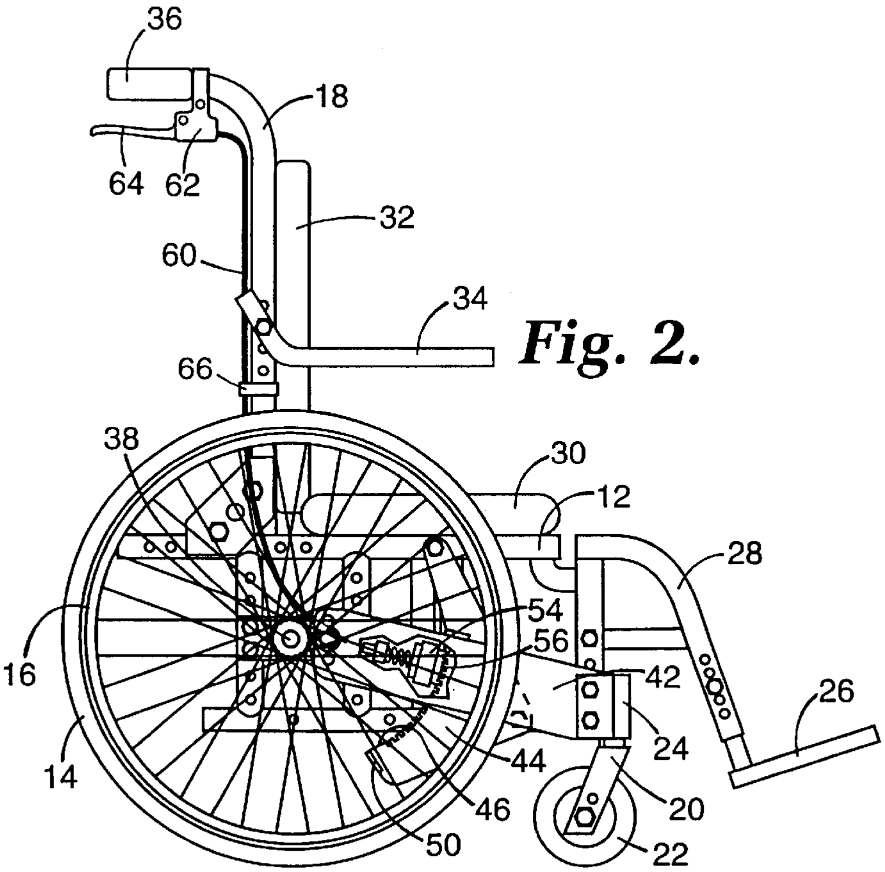
FIG. 2 is a side elevation, partly broken away, of the wheelchair of the invention in an upright position.

FIG. 2 depicts a side-elevation of the wheelchair of the invention in a fully upright position, showing complete assembly of all component parts, wherein the individual components are as described above in connection with FIG. 1.

Figure 3:
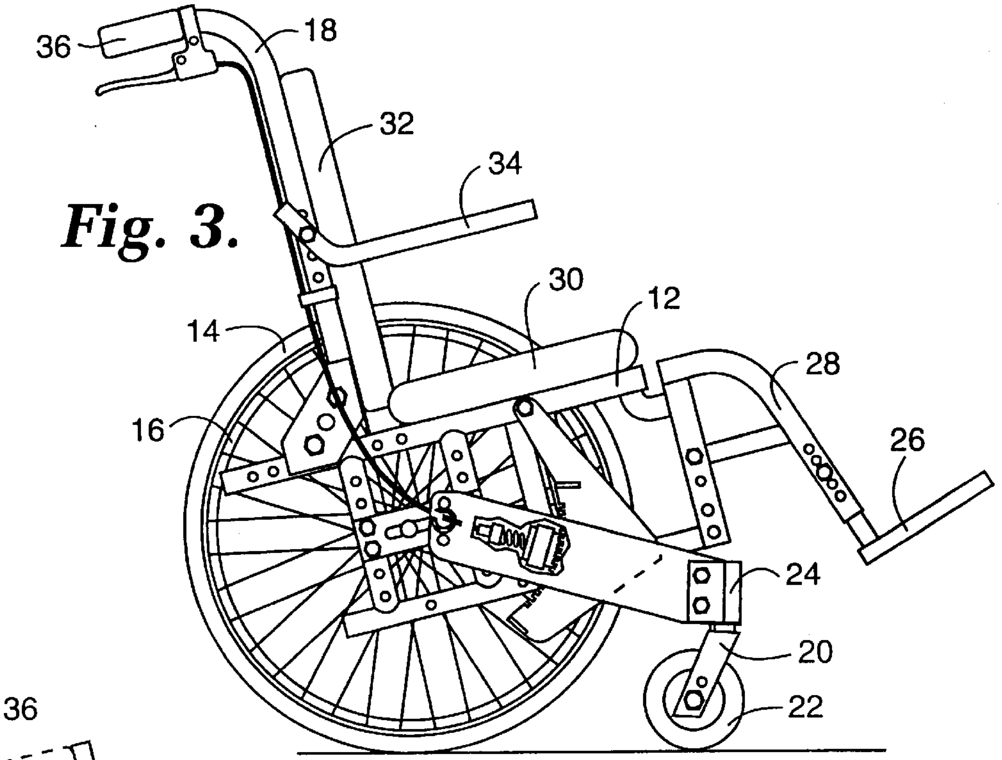
FIG. 3 is a side elevation similar to that shown in FIG. 1 in a partially tilted-back position.

FIG. 3 is similar to FIG. 1, but the chair is shown in a partially tilted-back configuration.

Figure 4:
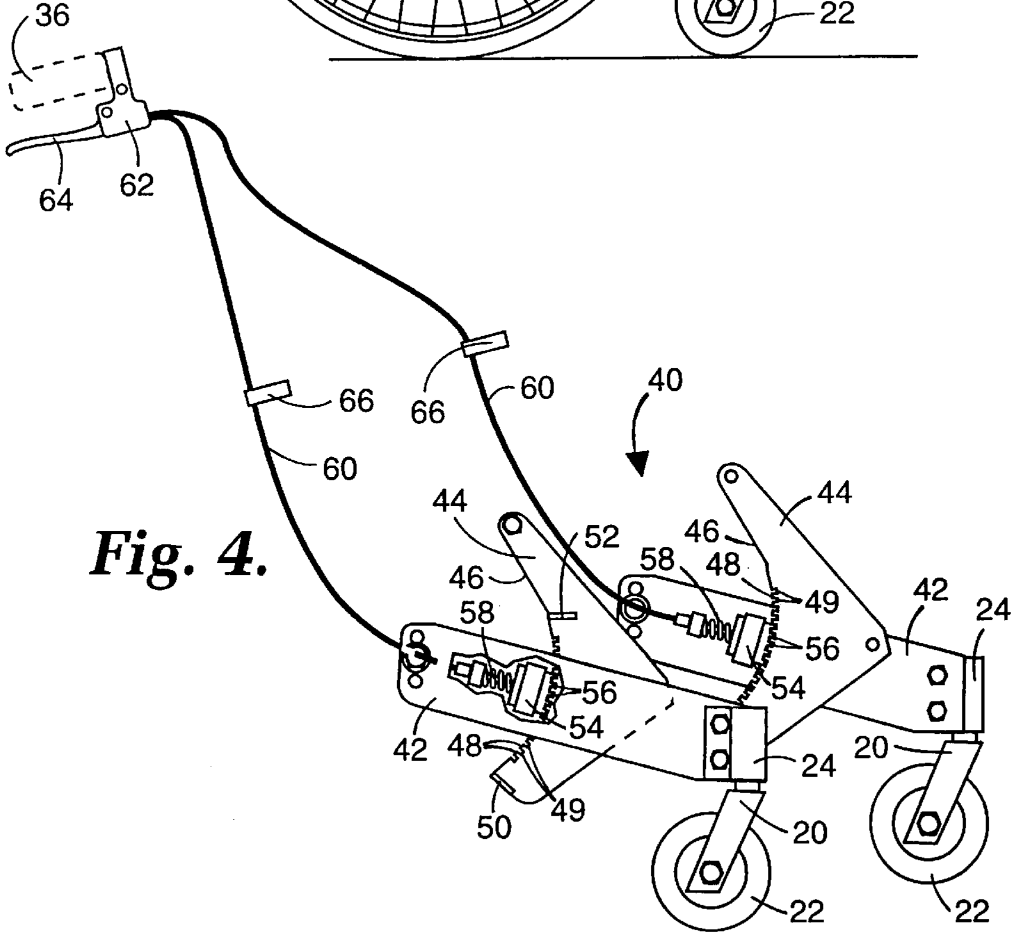
FIG. 4 is a schematic, perspective illustration of one embodiment of the apparatus, which may be attached to an otherwise conventional wheelchair in order to provide the improved wheelchair of the invention, shown in a locked configuration.

FIG. 4 shows a schematic perspective view of the hardware assembly 40 of the invention in the embodiment depicted in FIGS. 1 and 3, but with the wheelchair removed for illustration purposes. The right and left-hand assemblies are substantial mirror images of each other. Essential to the tilting and locking functions of the chair are the cooperative operating characteristics of the elongate supporting brace members 42 with their respective tilt-adjusting brace members 44. At its forward end, each support brace 42 has affixed to it the caster housing 24 which houses caster 20 and front wheel 22. Affixed to the body of support 42 is spring-biased head mechanism 54 having teeth 56 which mesh with the grooves 49 in brace member 44. Springs 58, controlled by hand lever 64 and cables 60, enable locking and disengagement of the teeth 56 in grooves 49 at any desired tilt rotation of the chair, all controlled by the attendant. Lower stop 50 and upper stop 52 provide safety stops which, respectively, prevent the chair from tilting too far forward or backward.

The rearwardly arcuate edges of brace members 44 are substantially concentric with the main axles 39 of the large drive wheels and provide the tilting capability of this chair. Importantly, the rearward end of the support brace 42 should be affixed to the frame 12 of the chair as close as possible to the axle 39 and axle hub 38 to enable tilting and simultaneously maintaining the caster 20 in substantially 90° orientation with respect to the ground surface on which the chair rests.

Also shown in FIG. 4 for completeness are the associated hardware components including cable guides and supports 66, cable handle housing 62 and chair handle 36. Only one handle 64 is shown controlling both cables 60, but this is a matter of preference. Independent handles could be employed to control adjustment of right and left tilt, but no particular advantage is seen from this modification.

FIG. 5 is virtually identical to FIG. 4 except that handle 64 has been depressed, indicated by the arrow, causing the gear teeth 56 to disengage from the grooves 49, indicated by the small arrow, thus permitting the chair to be tilted.

FIG. 6 is a front elevational view of the wheelchair of the invention showing the cross- or "X"-braces 72 under seat 30 which provide lateral support for this chair, as in conventional chairs. The braces 72 are hinged enabling these brace members to be folded as shown in FIG. 6A and the entire chair collapsed for transport. The back 32 is generally of a canvas type material which readily folds upon itself as shown in FIG. 6A.

FIG. 7 is a side elevation of a conventional wheelchair which is included for completeness. Like components are designated as above, and no further explanation is deemed necessary. It is to be noted that the tilt-and-lock mechanism described above, and that of the alternate embodiment described below, may be integrated into this conventional wheelchair simply by removing a few nuts and bolts, and securing the tilt-and-lock mechanism in place. Compare, for example, FIGS. 2 and 7.

Figure 8:
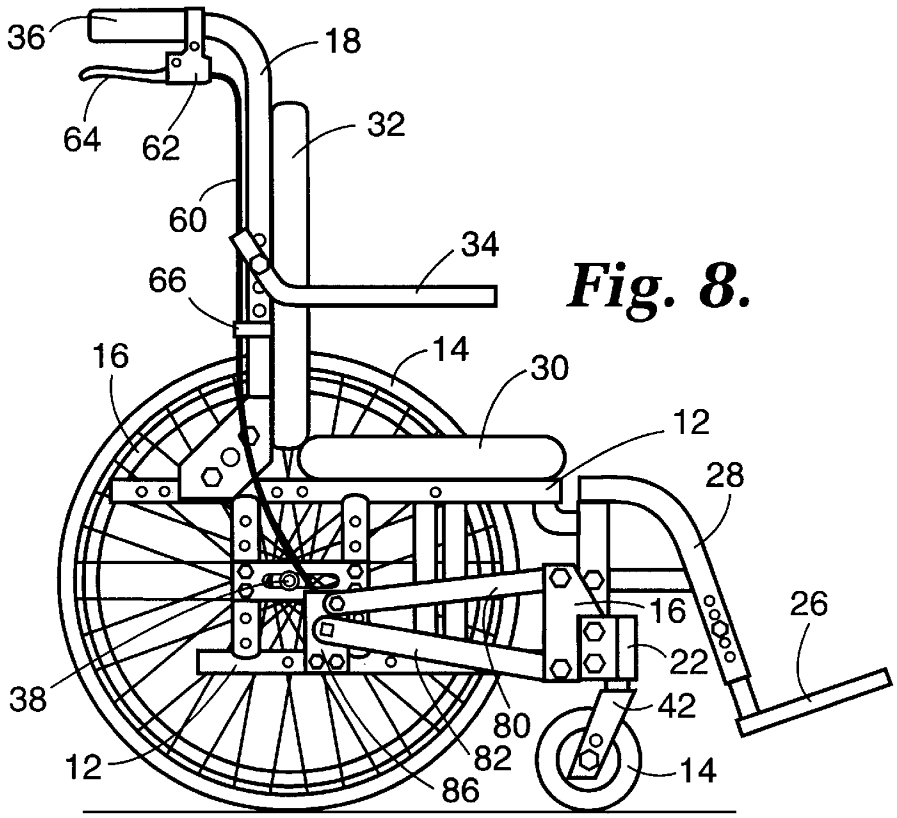
FIG. 8 is a side elevational view, similar to FIG. 1, of an alternate embodiment of the wheelchair of the invention, also shown with the right hand wheels (only) and associated mechanical components removed for illustration clarity, in an upright position.

An alternate embodiment of the wheelchair of the invention is depicted in FIG. 8. Again, like components are numbered as before, and both right hand wheels (only) are omitted for clarity of presentation. Focusing on the alternate tilt-and-lock mechanism, this includes generally horizontal upper brace 80 and lower brace 82 bolted to generally vertical main end brace 86, which, in turn, is bolted to the frame 12 of the chair. The front ends of these braces 82, 84 are bolted to the front caster housing assembly, as shown. When main brace 86 is bolted very near to the hub 38 of drive wheel 14, the caster assembly and caster wheels 22 are maintained in their generally 90° orientation with respect to the ground surface during tilting of the chair.

Figure 9:
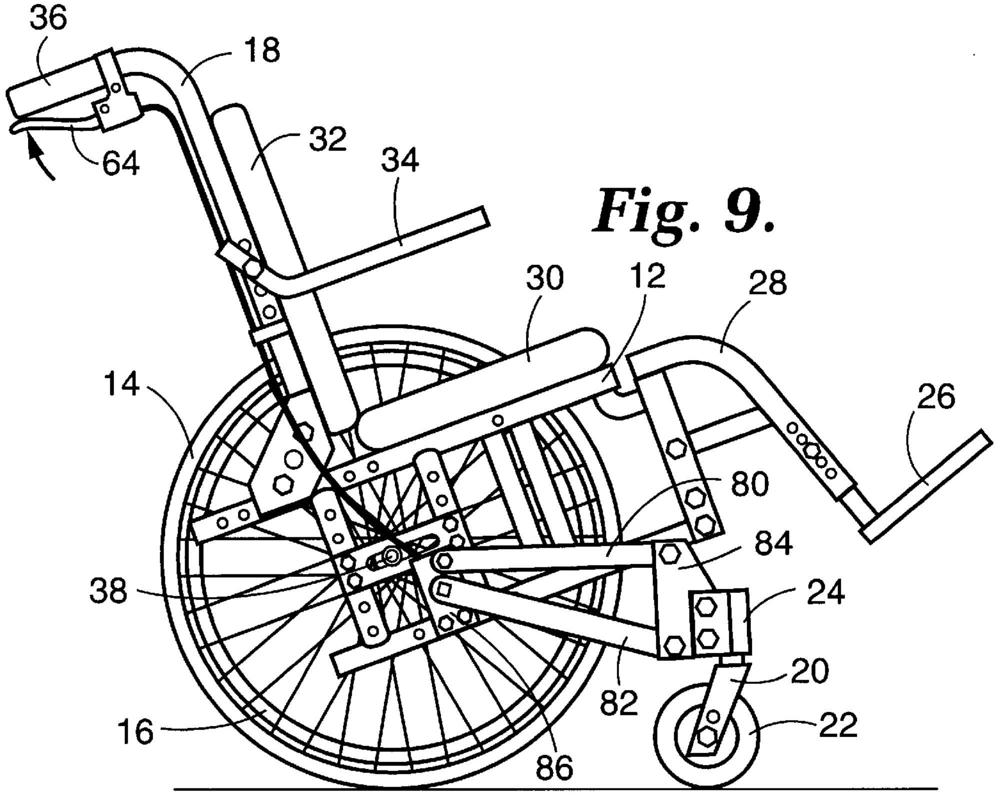
FIG. 9 is a side elevation of the alternate embodiment of the wheelchair shown in FIG. 8 in a tilted-back position.

FIG. 9 depicts the alternate embodiment of the chair shown in FIG. 8 in a tilted-back configuration, again where like components bear like number identification. The right hand components are, generally, mirror images of the left hand components.

Figure 10:
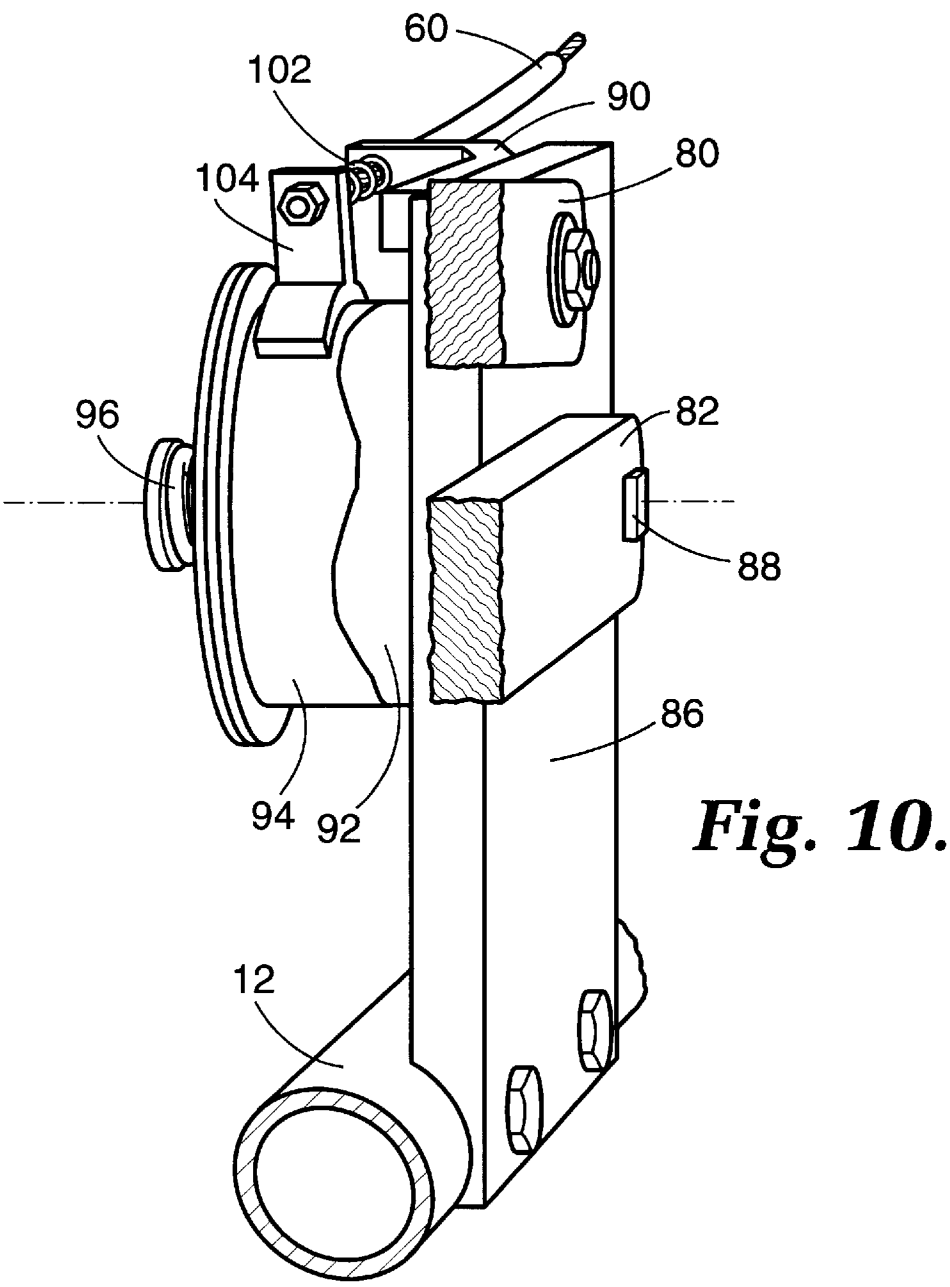
FIG. 10 is an enlarged perspective view of the brackets and an external view of the tilt-and-lock mechanism useful in this alternate embodiment of the chair of the invention.

FIG. 10 shows an enlarged perspective view, partly in cross-section, of the outside appearance of an alternate tilt-and-lock mechanism useful in the chair of the invention. It will be clear to one skilled in the art that various alternatives, other than those depicted herein, may be employed to achieve the tilt-and-lock capability of the chair of the invention. In FIG. 10, the top brace 80 is bolted to main brace 86 to which is affixed, by weld or bolts or other suitable means, outside cam housing 92. Mating with outside cam housing 92, as shown, is inside cam housing 94, held in place thereat by bias spring mechanism 96. Affixed in cooperative relationship by brackets 90 and 104 is the cable 60, whose end is attached to bracket 104 and having its own bias spring 102 which tends to keep the cam mechanism of housings 92 and 94 in their closed, mating positions shown in FIG. 10. Main brace 86 is shown bolted to the chair frame 12.

Figure 11:
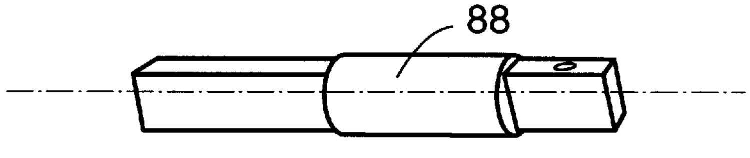
FIG. 11 is a perspective view of a locking pin particularly adapted to be used in the tilt-and-lock mechanism shown in FIG. 10.

Extending through the cam housings 92 and 94 and through brace 82 is the connecting pin 88, shown in FIG. 10 and in perspective in FIG. 11. Pin 88 has a rectangular cross-section end extending into brace 82 to lock it in position thereat and prevent its rotation. This pin 88 has circular cross-section where it extends through main bracket 86 and outside cam housing 92, and is free to rotate with respect thereto. Pin 88 has a rectangular cross-section again where it passes through a corresponding rectangular opening in inside cam housing 94, the rotation of which, caused by applied tension in cable 60, forces the inside cam housing 94 to separate from the outside cam housing 92, as is more clearly illustrated by a side-by-side comparison of FIGS. 12 and 13.

Figure 12:
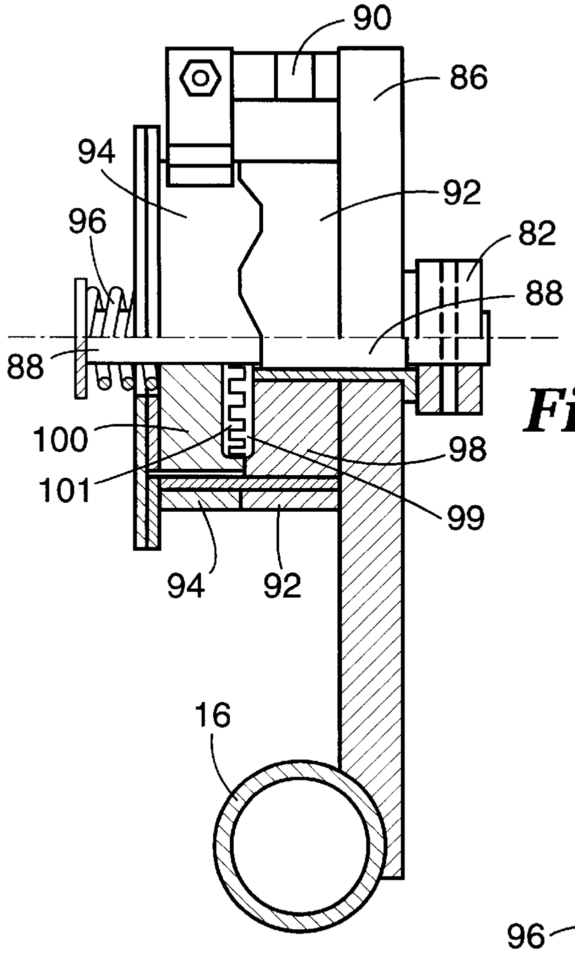
FIG. 12 is an enlarged elevational view, partly in cross-section, showing the details of the alternate tilt-and-lock mechanism of FIG. 10 in a locked position.
Figure 13:
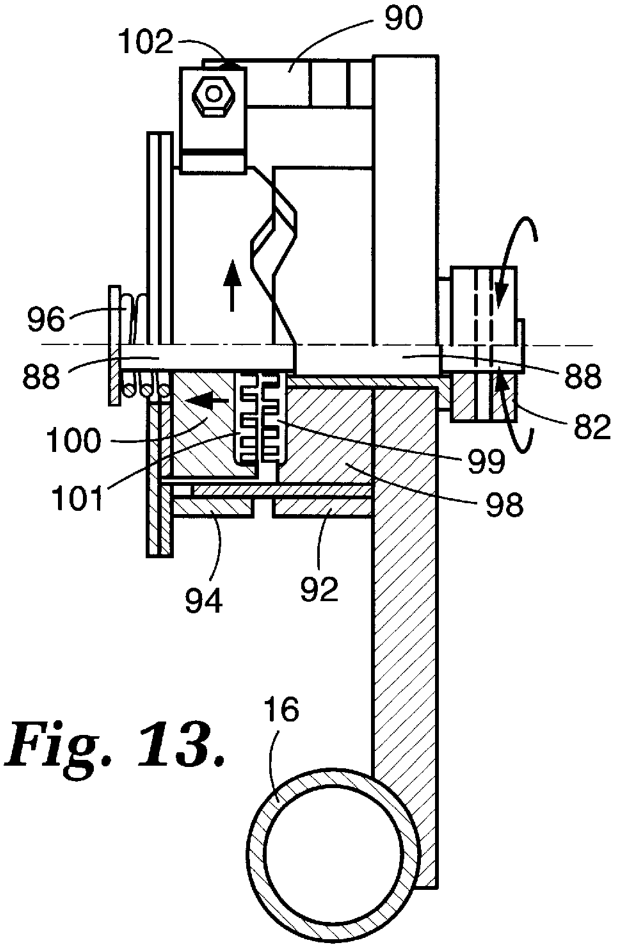
FIG. 13 is an enlarged elevational view, similar to FIG. 12, partly in cross-section, showing the details of the alternate tilt-and-lock mechanism of FIG. 10 in an open, unlocked configuration, permitting the chair to be tilted a desired degree of rotation.

In the lower portions of FIGS. 12 and 13 may be seen tooth-and-groove means 98 and 100, which may be cup-shaped in configuration having teeth 99 and grooves 101 in their respective rims. Cup 98 is affixed to outside cam means 92 by weld or bolts or otherwise and cup 100 is affixed similarly inside the inside cam means 94. The teeth 99 and grooves 101 act cooperatively to lock the cam means 92 and 94 in place in their closed, mating positions. Referring again to FIG. 10 as well as FIG. 12, when there is no tension applied to cable 60, the cam means 92 and 94 remain in a closed, mating and locked configuration. Referring to FIG. 13, tension has been applied to cable 60 causing rotation of outer cam housing 94 forcing it to separate from complete mating with inside cam housing 92, and the respective affixed cup means 98 and 100 also separate, thus disengaging their respective teeth and grooves, allowing for rotation of the chair frame 12 freely about the wheel axles, all as depicted by the arrows shown in FIG. 13. At the desired rotation of the chair and frame, the tension is released in cable 60, the cam housings again fall into a mating configuration, forced therein by bias spring 96, as illustrated in FIG. 12, thereby locking the tilt in place by the reengagement of the teeth 99 and grooves 101 at the selected tilt position.

While the invention has been disclosed herein in connection with certain embodiments and detailed descriptions, it will be clear to one skilled in the art that modification or variations of such details can be made without deviating from the gist of this invention, and such modifications or variations are considered to be within the scope of the claims hereinbelow.

What is claimed is:

1. Conversion apparatus for converting a manually propelled wheelchair, said wheelchair having conventional, large paired drive wheels mounted on axles, and paired, smaller independently castered front wheels, and including patient seating apparatus supported by a support frame mounted on said axles, said seating apparatus including seat, back, headrest, legrests and armrests, said wheelchair having X-braced, folding frame means which permits the unoccupied wheelchair to be folded side-to-side for ease of transport from one site to another, said conversion apparatus including means for detachably affixing to said wheelchair means for effecting rotation about said axles of said patient seating apparatus while maintaining said drive wheels and said castered front wheels all in fixed spatial relationship with respect to each other, which means for effecting rotation enables a patient seated in said wheelchair to be tilted backwardly or forwardly so as to rotate said patient spatially while maintaining all relative positions of said patient's body and limbs fixed with respect to one another, and means for locking said patient seating apparatus in place at a desired extent of rotation.

2. The conversion apparatus of claim 1 wherein the means for effecting rotation comprises:

two generally elongate supporting braces, each having a forward end and a rearward end, the rearward end of each being affixed to said support frame in close proximity to said axle, one adjacent each drive wheel, the forward end of each having a caster housing which houses one castered front wheel, and two tilt-adjusting brace members each acting cooperatively with one of said supporting braces, each tilt-adjusting brace member being affixed to said support frame intermediate between said forward and rearward ends of its cooperating support brace and in adjacent proximity thereto, and means for effecting relative movement of each said tilt-adjusting brace member relative to its cooperating supporting brace so as to effect rotation about said axle of said patient seating apparatus, and means for locking said supporting braces in fixed positional relationship with respect to said tilt-adjusting brace members at a desired extent of rotation.

3. The conversion apparatus of claim 2 wherein said tilt-adjusting brace members each have arcuate rearward edges possessing gear-like teeth therein, said arcuate edges being concave with respect to said axle and substantially concentric with respect thereto, and wherein said means for locking includes spring-biased tooth engaging means affixed to said supporting braces which releasably engage said gear-like teeth at said desired rotation and effect locking of said patient seating apparatus thereat.

4. The conversion apparatus of claim 2 including a manually operated lever control mounted so as to be gripped by an attendant pushing the wheelchair and having flexible cable means mounted on said frame rearwardly of said patient extending from said lever to said spring-biased tooth engaging means, whereby application of grip pressure applies tension to said cable, compression to said spring and disengages said tooth-engaging means, upon release of which the tooth-engaging means reengage to lock the wheelchair in position, thereby providing manual control of locking of said patient seating apparatus at the desired extent of rotation.

5. The conversion apparatus of claim 2 including additional, independently adjustable, means for spatially varying and adjusting each of said seat, back, headrest, legrests and armrests.

6. The conversion apparatus of claim 1 wherein the means for effecting rotation includes cam-actuated locking means for engaging and disengaging said locking at any desired degree of rotation of said wheelchair.

7. The conversion apparatus of claim 6 including a manually operated lever control mounted so as to be gripped by an attendant pushing the wheelchair and having flexible cable means mounted on said frame rearwardly of said patient extending from said lever to said cam-actuated locking means, whereby application of grip pressure applies tension to said cable, rotation of said cam means and disengages said locking means, upon release of which the locking means reengage to lock the wheelchair in position, thereby providing manual control of locking of said patient seating apparatus at the desired extent of rotation.

8. The conversion apparatus of claim 6 including additional, independently adjustable, means for spatially varying and adjusting each of said seat, back, headrest, legrests and armrests.

9. A convertible wheelchair having the conversion apparatus of claim 1 installed thereon.

* * * * *